Sept. 28, 1965 H. R. KAZARIAN 3,208,534
MEANS FOR PROTECTING A WATER COOLING TOWER
Filed Sept. 7, 1961 5 Sheets-Sheet 1

INVENTOR.
HAIK R. KAZARIAN
BY *Martin P. Wittstein*
ATTORNEY

Sept. 28, 1965 H. R. KAZARIAN 3,208,534
MEANS FOR PROTECTING A WATER COOLING TOWER
Filed Sept. 7, 1961 5 Sheets-Sheet 3

INVENTOR.
HAIK R. KAZARIAN
BY *Martin P. Wittstein*
ATTORNEY

Sept. 28, 1965     H. R. KAZARIAN     3,208,534
MEANS FOR PROTECTING A WATER COOLING TOWER
Filed Sept. 7, 1961                5 Sheets-Sheet 4

INVENTOR.
HAIK R. KAZARIAN
BY
*Martin D. Wittstein*
ATTORNEY

3,208,534
MEANS FOR PROTECTING A WATER COOLING TOWER
Haik R. Kazarian, Providence, R.I., assignor to Grinnell Corporation, Providence, R.I., a corporation of Delaware
Filed Sept. 7, 1961, Ser. No. 136,480
7 Claims. (Cl. 169—2)

This invention relates generally to fire protection sprinkler systems, and more particularly to a novel fire protection sprinkler system for a commercial water cooling tower wherein certain new features of construction of the cooling tower cooperate with a novel sprinkler nozzle to produce maximum distribution of water throughout the tower.

In the field of industrial air conditioning, it is considered impractical to use a forced air draft to cool the condenser of the air conditioning refrigerating equipment. This is so because an industrial system is of such large capacity in terms of B.t.u. output that the blower and ducting required to cool such a condenser by the aforementioned means would be of prohibitive size and cost. A more suitable heat transfer medium is therefore required in industrial installations, and water has been found to be ideal for the intended use. It is usually abundant, has a much higher specific heat than does air, and is easily handled with respect to pumping and movement from one part of the system to another.

A means must be provided for cooling the water that has been heated as a result of having been passed over the condenser of the air conditioning system so that the same water may be recirculated and reused. Such a means is the commercial cooling tower. Generally speaking, one type of commercial water cooling tower consists of a pair of wood frame units that are spaced far enough apart to permit the placement therebetween of a large blower unit. Thus, as an example, each wood frame unit might be in the order of twelve by sixteen feet in horizontal cross-section by fifteen feet in height. Typically, the frame unit is covered with a solid wall or siding on two opposite ends, and is covered with louvers on the side thereof opposite the blower unit. Thus, when the blower unit is in operation, air is drawn from the louvered side through the frame unit and is then sucked upwardly through the space between two such frame units. A forced air draft is thereby created within the frame units from the louvered side of each unit toward the center or fan deck side, since the blower is customarily elevated above ground level on a suitable deck.

Each wood frame unit contains a grid-type construction which supports thin wood slats, each slat being slightly offset from the one above so that water dripping off one slat will fall on the surface of the slat immediately therebelow. The grid-type construction and the slats together constitute the fill, as more fully described hereinafter. Mounted on the top of the frame is a distribution basin which usually contains about four to five inches of water therein to provide a head, the water being permitted to fall by gravity through a plurality of holes drilled in the bottom of the distribution basin. The water drops to a distribution deck supported beneath the distribution basin in spaced relation thereto and then to the slats supported by the grid construction; it then drips in step-like fashion from slat to slat, passing through the air draft as it falls. In falling, the water is cooled by the air passing through the wood frame unit, the slats causing the water to remain in drop formation to expose the maximum possible surface area of water to the air draft to obtain the most efficient cooling. The water is collected in a collection basin at the bottom of the wood frame unit and is then pumped back to the condenser unit of the air conditioning system for reuse therein.

Each frame unit of the cooling tower constitutes a potential fire hazard when the tower is not in use and is therefore dry. Because of the construction characteristics of the tower a fire breaking out in any part thereof, or in any structure adjacent the tower, would quickly spread to other parts of the frame unit and eventually consume it entirely. The nature of the construction is such that an excellent natural draft would facilitate the rapid spread of a fire. It is therefore necessary that a fire protection system be devised which, when actuated by appropriate means, will immediately deluge a substantial portion or the entire structure with water to both prevent spreading of the fire to any other part of the structure and also to quench that amount of fire present when detected. The preferred type of fire protection system for the above purposes is an automatic sprinkler system having a heat sensing means to detect the presence of fire.

Conventionally, an automatic sprinkler system comprises a source of water under pressure, conduits for conveying the water to the protected location, sprinkler nozzles for distributing the water in a desired pattern over the protected area, and a means for detecting the presence of a fire and for actuating the sprinkler nozzles. The sprinkler nozzles may be either the "closed" or "open" type; with the former, the flow path through the sprinkler nozzle is closed by a valve located in the sprinkler nozzle which blocks the flow of water, and each sprinkler nozzle has its own heat sensing device, which is actuated upon the presence of the required amount of heat to open the valve for the particular sprinkler nozzle and no other. With the latter type, all of the sprinkler nozzles in the system are open, and water flow is blocked at a central location. There are separate means strategically located in the area to be protected for sensing the presence of heat and for actuating the central water control means to admit water to all the sprinkler nozzles in the system simultaneously. This latter type is known as the deluge system. The present invention is applicable to either system.

There are currently in use two preferred types of fire protection sprinkler systems for commercial water cooling towers, both having serious drawbacks. The first of these two methods is an automatic sprinkler system wherein the conduits for conveying the water and supporting the sprinkler nozzles are mounted over the distribution basin in position to flood the basin with water in the event of actuation of the system. The water from the sprinkler nozzles is permitted to flow into the basin, through the holes in the floor thereof and down over the distribution deck and through the fill in the same manner as would the water from the air conditioning system if the cooling tower were in use. Two difficulties are encountered with this method: firstly, it has been found that the sprinkler system, in the ordinary course of its operation, is not capable of delivering sufficient water to build up the required head in the distribution basin so that an even flow is obtained through the perforated floor thereof regardless of whether the tower is exactly level or not. Therefore, with such a sprinkler system, the distribution basin must be perfectly level to prevent the water from running toward one side or toward one corner, leaving other portions of the frame unit substantially or wholly unwetted. Secondly, during the winter months it is highly possible for the openings in the floor of the distribution basin to become clogged with ice or snow, or other debris, to an extent sufficient to block the passage of water therethrough in the event of fire, thus rendering the fire protection system almost completely useless.

Another method of fire protection for the cooling tower currently in use is the sidewall type sprinkler nozzle. This type of sprinkler nozzle has a deflector thereon of such shape and contour that the water is sprayed in a pattern which is suitable for distribution along a vertical wall. Approximately one half of the water is directed outwardly from the nozzle, while the remainder is directed backwardly toward the wall. The sidewall sprinkler nozzle is mounted adjacent a wall or other vertical surface rather than in the middle of the area to be protected. In the present installation, the sprinkler nozzle is intended to be installed on a side of the tower, just under the distribution basin, in such a manner that the bulk of the water is directed into the narrow space between the underside of the distribution basin and the distribution deck. However, it has been found that insufficient water is directed into this space with the sidewall sprinkler nozzle to be efficient on the average size cooling tower and portions of the tower remain unwetted; further, that quantity of water which is directed backwardly by the sidewall sprinkler nozzle is entirely wasted when the sprinkler nozzle is mounted as just indicated. Hence its efficiency is further reduced. It has also been found that even if sidewall sprinkler nozzles are installed on opposite sides of the frame unit on alternate bays, the central portion thereof is not properly wetted in proportion to the rest of the unit.

Accordingly, to overcome the above mentioned difficulties, I have designed an improved fire protection sprinkler nozzle for use with my sprinkler system. It is intended, in its present embodiment, that the sprinkler nozzle shall be mounted on a side of the cooling tower wood frame unit in a position similar to that now used by the sidewall type sprinkler nozzle, except that my improved sprinkler nozzle is mounted to direct its spray horizontally into the space between the under surface of the distribution basin and the upper surface of the distribution deck. The construction of the distribution deck, more fully described hereinafter, cooperates with the stream of water so directed to assist in distributing the water over a greater range than has heretofore been possible.

I have further provided a means whereby a substantially solid stream of water issuing from a sprinkler nozzle in a generally horizontal path is divided into two smaller streams of unequal size by an obstruction place in the flow path adjacent one edge thereof. I have discovered that if the obstruction is shaped according to a particular configuration, which configuration is fully described hereinafter, the two streams combine to cover an area which is considerably greater than would be the area covered by the solid stream in the absence of the obstruction. This is accomplished by deflecting the smaller of the aforementioned two streams downwardly in a spray pattern. Simultaneously therewith, the side of the larger of the two streams that is nearer to the obstruction is drawn slightly away from the longitudinal axis of the larger stream downwardly to broaden out its flow pattern; also, the side of the smaller of the two streams that is nearer to the obstruction is drawn slightly away from the longitudinal axis of the smaller of the two streams upwardly to correspondingly broaden out its flow pattern. Thus, the aforementioned sides of the respective streams that are drawn away substantially meet beyond the obstruction so that there is substantially no void between the two streams which would leave an area beyond the obstruction unwetted. Hence, there is, in effect, a stream of large proportion which will distribute itself over the major portion of the length of the wood frame unit, and a supplementary portion or spray which is separated by the aforementioned obstruction from the first mentioned stream and is directed over that part of the frame unit that is not covered by the larger stream, usually the first three to five feet from the sprinkler nozzle, depending on the water pressure. Thus, with proper nozzle placement, the entire frame unit is deluged with water in sufficient quantity and pattern of distribution to be as effective in fire protection as would be the cooling water itself if the cooling tower were in actual operation.

It is, therefore, a primary object of the present invention to provide an improved fire protection sprinkler system for use with an industrial air conditioning water cooling tower.

It is another object of the present invention to provide an improved fire protection sprinkler system for use with an industrial air conditioning water cooling tower wherein certain structural features of the cooling tower frame unit are cooperatively employed with the direction and pattern of water distribution to achieve maximum coverage of the protected area.

It is another object of the present invention to provide an improved automatic sprinkler nozzle for use with a commercial water cooling tower which, when actuated by heat from fire, will effectively wet all parts of the cooling tower frame unit which the particular sprinkler nozzle is intended to cover.

It is still another object of the present invention to provide an improved automatic sprinkler nozzle which will direct a main or larger stream of water over a major portion of the length of the wood frame unit, and a supplementary or smaller stream or spray of water which will cover that portion of the frame unit not covered by the main stream, so that all parts of the frame unit covered by the particular sprinkler will be wetted during operation thereof.

It is yet another object of the present invention to provide a novel apparatus for wetting a structure, primarily a horizontal surface thereof, whereby the largest possible longitudinal distance is covered with water, measured along the longitudinal axis of a substantially horizontal stream of water.

Another object of the present invention is to provide a novel apparatus for wetting a structure, primarily a horizontal surface thereof, whereby a substantially solid stream of water is divided into two streams of unequal size which combine to cover an area larger than that of the original unbroken stream by depressing the bottom surface of the upper stream and raising the upper surface of the lower stream so that they are substantially contiguous.

Other objects and advantages of the present invention will become apparent from the detailed description which follows when considered in conjunction with the accompanying drawings.

In the drawings, in which the same reference numerals are used throughout the several views to indicate like parts:

Figure 1:
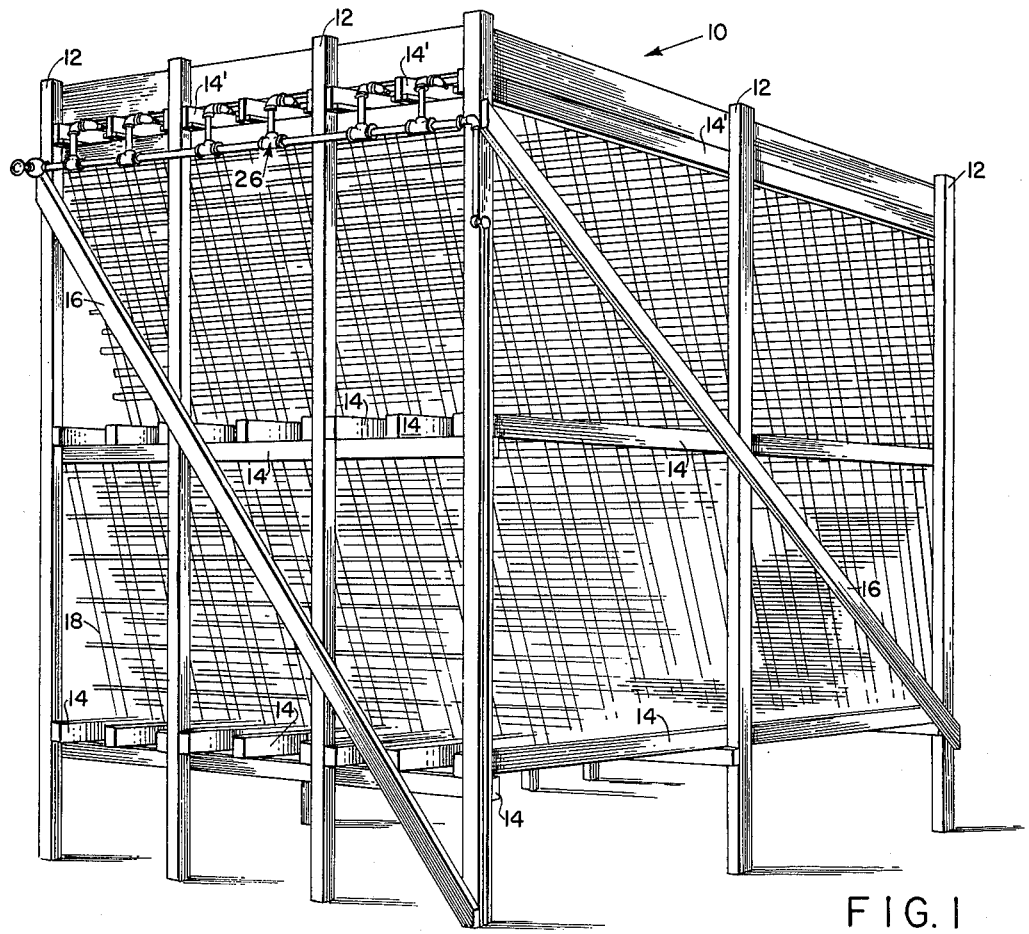
FIG. 1 is a perspective view of a typical wood frame unit of a commercial cooling tower, illustrating the grid-type construction and wood slats, and the general location of the fire protection system.

Referring now to FIGS. 1–4, a wood frame unit 10 of the cooling tower is shown. The frame unit comprises a plurality of vertical support posts 12 at the corners and at points intermediate the corners. These posts support a plurality of horizontal members 14, both transverse to, and longitudinally of, the major dimensions of the unit, which members divide the frame unit into several bays or sections. The unit is given added stability and strength by diagonal bracing 16. The entire inside of the wood frame unit 10, except for an uppermost portion thereof, is filled with a fibrous grid construction 18, more clearly seen in FIGS. 2 and 3, which is supported from the uppermost layer of horizontal members 14. The grid construction in turn supports a plurality of slats 20 in stepped arrangement, as clearly seen in FIG. 3, with the result that any water which runs off the edge of a slat will fall onto the upper surface of the slat immediately therebelow, and so on to the bottom of the frame unit. Thus water is prevented from falling too rapidly through the slats and also is maintained in drop formation throughout its fall. The slats and grid construction taken together are hereinafter referred to as the fill.

Adjacent the top of the wood frame unit 10 is a distribution deck 21 which consists of a layer of fixed slats 22 which are spaced together more closely than are the slats 20 which form part of the fill. The slots 22 are held together by a pair of runners 23 which overlie the slats 22.

Figure 3:
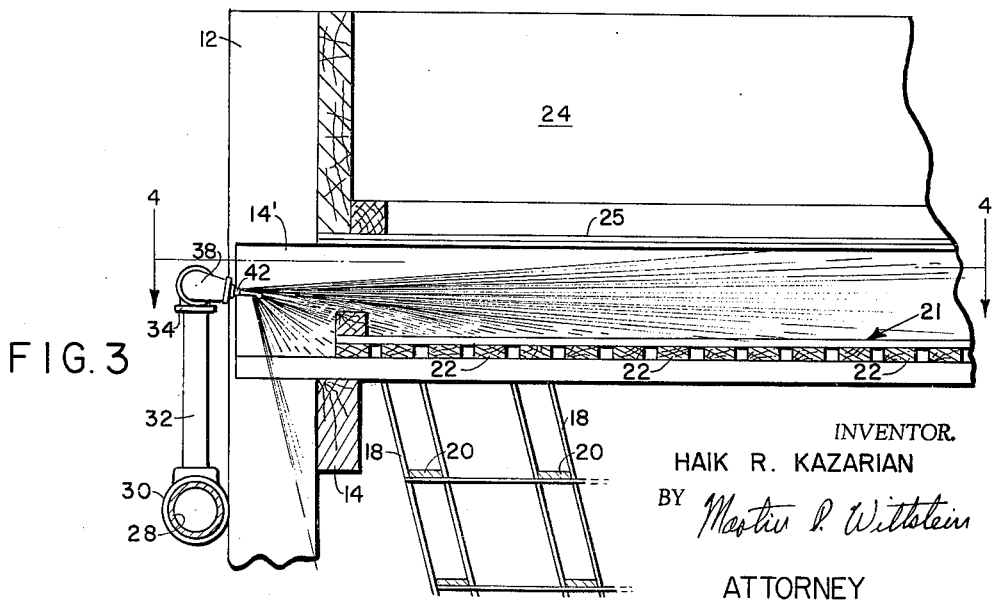
FIG. 3 is a fragmentary side sectional view through the length of the frame unit illustrating the manner of water distribution in the confined space between the under surface of the distribution basin and the upper surface of the distribution deck.

The top-most layer of horizontal members which extend longitudinally along the major dimension of the wood frame unit 10, and which are labeled 14', are joists which support a distribution basin 24 with the floor 25 thereof in spaced relation to the upper surface of the distribution deck 21, as clearly seen in FIG. 3.

The distribution basin 24 is merely a rectangular basin having the aforementioned bottom 25 and four sides, and covering the entire surface area of the frame unit 10. The bottom 25 of the distribution basin is perforated by a plurality of apertures at spaced intervals for the passage of water therethrough. In use, about four or five inches of water is maintained in the distribution basin at all times so that there will be a substantially even discharge of water from all parts of the basin regardless of whether or not the frame unit 10 is perfectly level.

It will now be appreciated, from the foregoing discussion, that the frame unit is utilized in the following manner: By appropriate means, the proper head of water is maintained in the distribution basin 24, which water falls by gravity through the apertures in the bottom 25 and is distributed evenly by the slats 22 of the distribution deck 21 over the slats 20 of the fill. The water descends through the fill, dripping from slat to slat, and is cooled by the air passing through the frame unit. The cooled water is collected in a collection basin, not shown, at the bottom of the frame unit and pumped to an industrial air conditioning system, where it is used to cool the condenser unit of the refrigerating system. The water is then recirculated back to the cooling tower and pumped to the distribution basin 24 to be cooled and used again.

Figure 2:
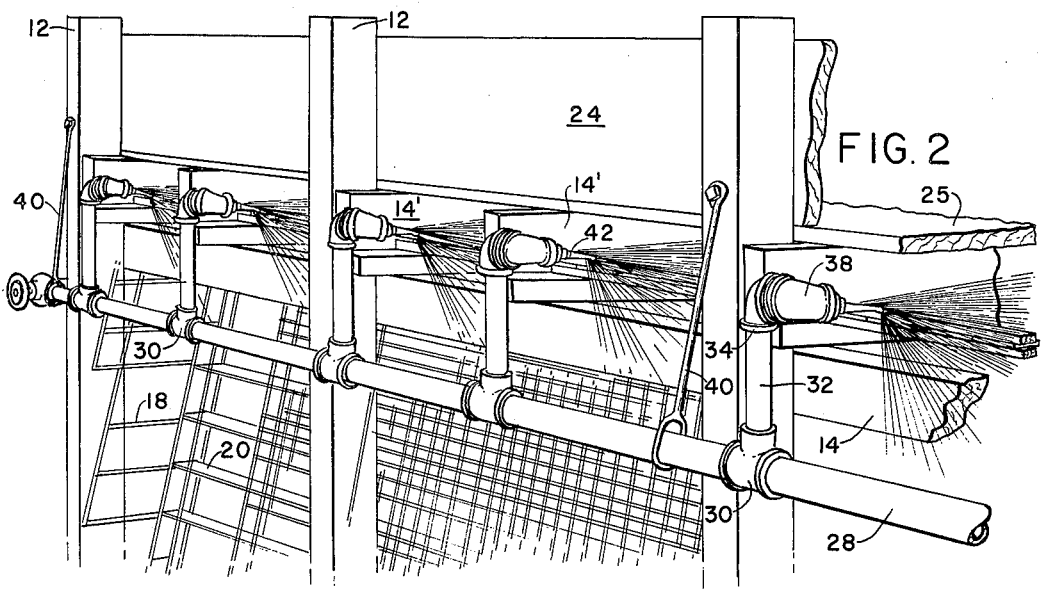
FIG. 2 is a fragmentary perspective view on a larger scale of a portion of FIG. 1, showing more accurately the location of the fire protection system in its relation to the distribution basin of the wood frame unit.

During the "off-seasons" or at such other times when the air conditioning system is not in use, the frame unit is dry and consequently constitutes a serious fire hazard. For protection against such hazard, a fire protection system, generally indicated by numeral 26, is installed on one or both ends of the frame unit, depending upon its length. Referring more particularly to FIGS. 2 and 3, the fire protection system consists generally of a supply pipe 28 which is broken up by a series of T fittings 30 at spaced intervals therealong. Protruding from each T fitting stem is a short length of pipe 32 having an elbow fitting 34 on the end remote from the end connected to the T fitting. The elbow 34 is joined by a short nipple to a reducing elbow 38, which has its smaller end directed inwardly toward the interior of the frame unit, as clearly indicated in FIG. 3. A sprinkler nozzle 42 is screwed or otherwise suitably connected to the smaller end of the reducing elbow 38 for distribution of water into the frame unit. Both the sprinkler nozzle 42 and the distribution of the water are more fully described hereinafter. The entire assembly is conveniently supported on the frame unit by any suitable means, and is here shown to be a plurality of pipe hangers 40 secured at one end to the vertical posts 12 and supporting the main supply pipe 28 from the other end.

Figure 6:
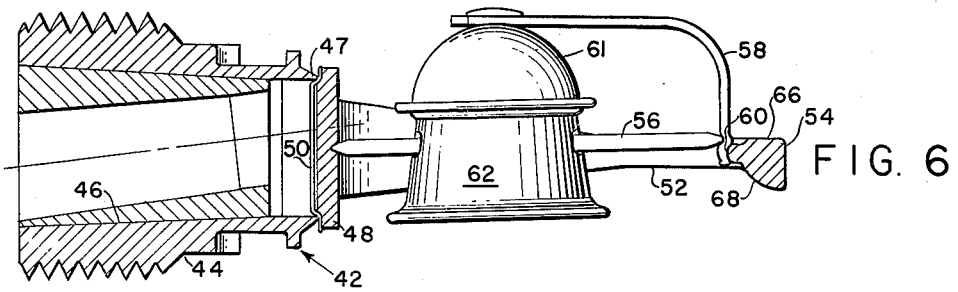
FIG. 6 is a side view, partly in section, of the improved sprinkler nozzle of this invention, showing also an illustrative actuating mechanism.
Figure 7:
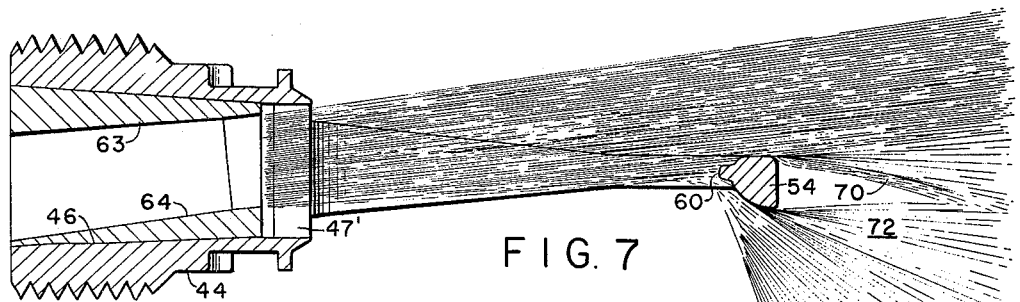
FIG. 7 is a view similar to FIG. 4 but with the actuating mechanism removed and the water discharge taking place.
Figure 8:
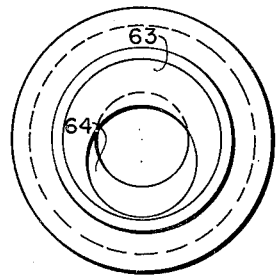
FIG. 8 is an end view of the device of FIG. 6 looking through the flow passageway.

The sprinkler nozzles 42 are the means by which the water for fire protection purposes is distributed over the protected area of the wood frame unit 10. Generally, these nozzles may be either the "open" or "closed" type, discussed hereinbefore. The principles of the present invention can be utilized with either system, or with a combination of both; for purposes of illustration, a closed type sprinkler nozzle is shown in FIG. 6; the open type is the same nozzle structure with the actuator mechanism removed, and is shown in FIG. 7, with water discharging therefrom to show the distribution pattern, which is more fully discussed hereinbelow. Since the specific actuator shown forms no part of the present invention and is illustrated merely as a preferred embodiment, a brief description thereof will suffice.

Referring again to FIG. 6, the sprinkler nozzle is seen to comprise a body 44 having a tapered bore 46 therethrough. The body 44 terminates in a valve seat 47 which surrounds an outlet orifice 47' and receives a disk valve 48 to close the end of the bore 46 and prevent the passage of water therethrough. There is a thin copper washer 50 between the disk valve 48 and its seat 47. Integral with the body 44 and attached to one end thereof is a pair of yoke arms 52 which are of T-shaped cross-section at first but whose outstanding edges merge into a semi-ovate cross-section as the arms join at the outer end in a splitter element 54. The disk valve 48 is securely held on its seat 47 by the strut 56 which is tightly wedged between the disk valve at one end and one end of a spring hook 58 at the other end. The spring hook 58 is L-shaped and has one end thereof caught under a substantial knife edge 60 formed on the inside surface of the splitter element 54. The other end of the spring hook 58 is riveted to a hollow semi-spherical member termed a key 61 which, in turn is secured to a similarly shaped element called a heat collector 62, this latter element being substantially longer than the key 61 and having a flared end as shown. The heat collector 62 is mounted on the strut 56 by having two openings on opposite sides thereof through which the strut 56 is passed. It will be noticed that the points of contact between the strut 56 and the spring hook 58, and the spring hook 58 and the knife edge 60 of the splitter element 54 are offset from one another so that the strut 56 tends to force the spring hook outwardly and draw the attached key 61 away from the heat collector 62. However, the key 61 and the heat collector 62 are secured together by a heat fusible material such as solder so that these two members cannot separate except in the presence of the required amount of heat. Thus the valve is maintained closed. When sufficient heat reaches the heat collector to melt the heat fusible material, the key 61 is suddenly drawn away from the heat collector 62 by the spring hook 58, which also wedges the strut 56 out of position between the yoke arms 52 as the spring hook 58 moves outwardly. The line pressure will push the disk valve 48 and the washer 50 away from the seat 47 and the sprinkler nozzle will be ready for operation.

Referring now to FIG. 7, the sprinkler nozzle is shown with the actuating mechanism removed and with water flowing from the nozzle in the same manner as if the nozzle were in operation and had been opened by the presence of heat. It will be seen that the bore 46 of the body 44 has a bushing 63 therein, the bushing having an external surface that conforms to the surface of the bore 46. The bushing 63 has an internal bore 64 constituting a flow passageway which terminates adjacent the outlet orifice 47' and which is slightly tapered over most of its length, with a short cylindrical section near its discharge end. It will be noticed that the longitudinal axis of the bore 64 is disposed at an angle to the longitudinal axis of the bore 46 of body 44, this latter axis being also the longitudinal axis of the sprinkler nozzle 42. Because of the angle of the axis of bore 64 relative the axis of sprinkler nozzle 42, the solid stream of water that issues from the sprinkler nozzle does not follow the axis of the sprinkler nozzle, but rather follows, at least initially, a path that is generally along the axis of bore 64. This angle, which is approximately 6½°, is selected so that the knife edge 60 of the splitter element 54 will be disposed near an edge of the solid stream of water rather than centrally thereof as would be the case if the bushing 63 were not present. Accordingly, as seen in FIG. 7, the splitter element 54 divides the main stream into two smaller streams of substantially unequal size, each stream being directed on opposite sides of the splitter element 54.

The splitter element 54 has two opposed surfaces 66 and 68 which generally diverge from each other forming a somewhat wedge-shaped member, the edge 60 being at the narrower end. The surface 66, adjacent the longitudinal axis of the bore 64, is substantially flat and lies in a plane that is substantially parallel to a plane formed by the two yoke arms 52, this latter plane in turn being parallel to the longitudinal axis of the sprinkler nozzle 42. Thus, the surface 66 is disposed at about the same angle to the longitudinal axis of the solid stream of water as this axis is to the axis of the sprinkler nozzle 42. The effect of this relationship is that as the major portion of the main stream, or the larger of the two streams after the main stream is divided, passes over the surface 66, an under portion of this larger stream, designated 70 in FIG. 7, is drawn slightly downwardly because of the tendency of water to flow along and follow the general direction of a surface over which it is directed. This downwardly drawn portion of the larger stream serves to vertically widen or broaden out the extent of this stream of water. The remainder of this larger stream is otherwise permitted to pass the splitter element 54 unobstructed and to continue into the space between the distribution basin and the distribution deck, as more fully described hereinafter.

The undersurface 68 of the splitter element 54 is shaped generally as semi-spherical, and appears round in cross section. As seen in FIG. 7, the smaller of the two streams of water that is directed under the surface 68, is initially deflected downwardly by the angle of the surface 68 near the narrower end of the splitter element 54. However, this surface slopes more toward a horizontal position as it approaches the wider end of the splitter element 54 until it is substantially horizontal. The result of this configuration is that the smaller of the two streams is not only deflected downwardly at a relatively steep angle, but also is spread or fanned out considerably in a vertical direction so as to present a fairly wide spray pattern over an area a short distance away from the nozzle. This effect may clearly be seen in FIG. 3. This pattern is due primarily to the fact that, as set forth above with respect to the surface 66, the water adjacent the upper portion of this smaller stream has a tendency to follow the contour of the surface 68, and will leave this surface along a path that is generally parallel to the direction of the surface 68 adjacent the downstream end thereof. Hence, the upper portion of this smaller stream is brought from its initially downwardly deflected direction back to substantially a horizontal direction. This portion of the smaller stream is indicated by the numeral 72 in FIG. 7.

The net result of the simultaneous depression of the under portion 70 of the larger stream, and the elevation of the upper portion 72 of the smaller stream is that the void space beyond the splitter element is reduced to a minimum; that is, the specified portions of the two streams have a tendency to practically meet beyond the splitter element 54 and recombine into a substantially solid but diffused spray of water that will cover an area greater than that covered by the original solid stream which issued from the nozzle outlet 47'.

A final effect of the splitter element 54 not mentioned thus far is that because of the interference of the splitter element 54 with the smooth flow of water as it issues from the nozzle outlet, the larger stream is deflected very slightly upwardly. By thus raising its path or trajectory slightly, the range of this stream is increased at a given pressure from what it would have been if there were no splitter element in the path of the original stream. This result is clearly seen by comparison of FIGS. 9 and 10, discussed more fully hereinafter.

The relationship of the nozzle 42, the streams of water, and the wood frame unit construction can be best appreciated from an examination of FIG. 3. The nozzle 42 is mounted on the reducing elbow 38 with its longitudinal axis depressed from the horizontal by approximately 8°; remembering that the bore 64 of the bushing 63 is disposed at an angle to the axis of the nozzle 42 by approximately 6½°, the water, therefore, issues from the nozzle outlet 47' along a path that is initially depressed from the horizontal about 1½°. The initial solid stream is divided by the splitter element 54, the larger stream continuing into the space between the underside of the distribution basin and the distribution deck, this stream of water wetting the upper surface of the distribution deck progressively as under portions of this stream drop away along its path of travel. In practice, this larger stream wets the surface of the distribution deck from approximately four or five feet out from the sprinkler nozzle 42 to the other end of the distribution deck, or a distance of about sixteen feet. The smaller of the two streams that is deflected downwardly wets the first four or five feet of the distribution deck.

Figure 9:
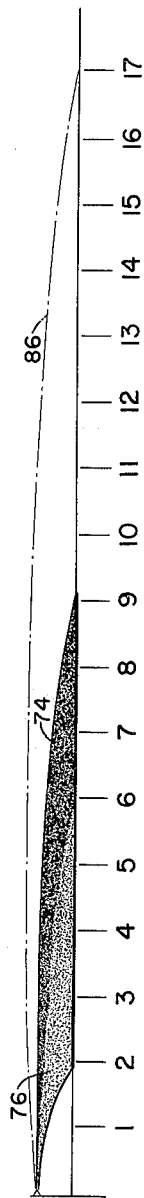
FIGS. 9 and 10 are graphic illustrations of the water distribution over a given distance at a given pressure with and without, respectively, the sprinkler nozzle of this invention.
Figure 10:
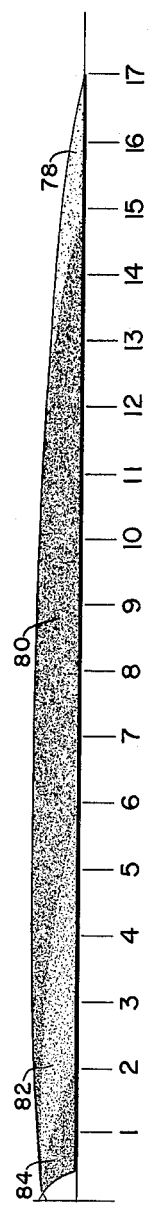
Figure 11:
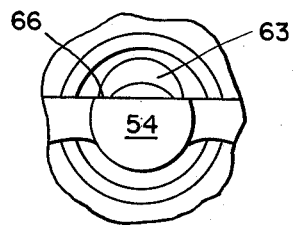
FIG. 11 is an outlet end view of the passageway portion taken perpendicular to the longitudinal axis of the device with a portion of the splitter element in its proper relative position.
Figure 12:
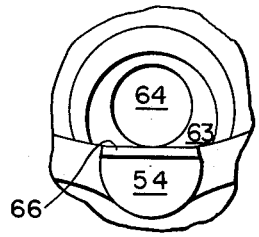
FIG. 12 is an outlet end view of the passageway portion taken perpendicular to the longitudinal axis of the flow passageway with a portion of the splitter element in its proper relative position.

The effects of this aspect of invention can be better understood by reference to the graphic representations of FIGS. 9 and 10. FIG. 10 illustrates the distribution of water at any given pressure, for example 25 p.s.i., from a sprinkler nozzle not having a splitter element thereon. With such a nozzle, the water tends to remain concentrated over an area from about four feet to nine feet out from the nozzle, as represented by the dark portion 74; some wetting takes place from about two feet to four feet due to drop off, as represented by the portion 76. FIG. 10 represents the distribution of water through a nozzle employing the principles of the present invention, all other conditions remaining the same. Firstly, it will be noticed that the upper limit of the longer stream is higher than in FIG. 9, as shown by the comparative dotted line 86, thereby giving a greater range of about fifteen feet. An additional foot or two is obtained in the area labeled 78 by virtue of the distribution deck construction, as more fully explained hereinbelow. The bulk of the larger stream will wet an area of the distribution deck indicated by the portion 80. The smaller of the two streams is deflected downwardly to wet the area of the distribution deck indicated as portion 84 of FIG. 10; and the under portion of the larger stream that is drawn downwardly and the upper portion of the smaller stream that is drawn upwardly, the portions labeled 70 and 72 respectively in FIG. 7, are indicated by the lightly shaded portion 82 of FIG. 10 as covering the intermediate area of the distribution deck from about two feet out from the sprinkler nozzle to about five or six feet out therefrom. Thus, the entire surface of the distribution deck is covered with an adequate amount of water for the intended purpose.

Figure 4:
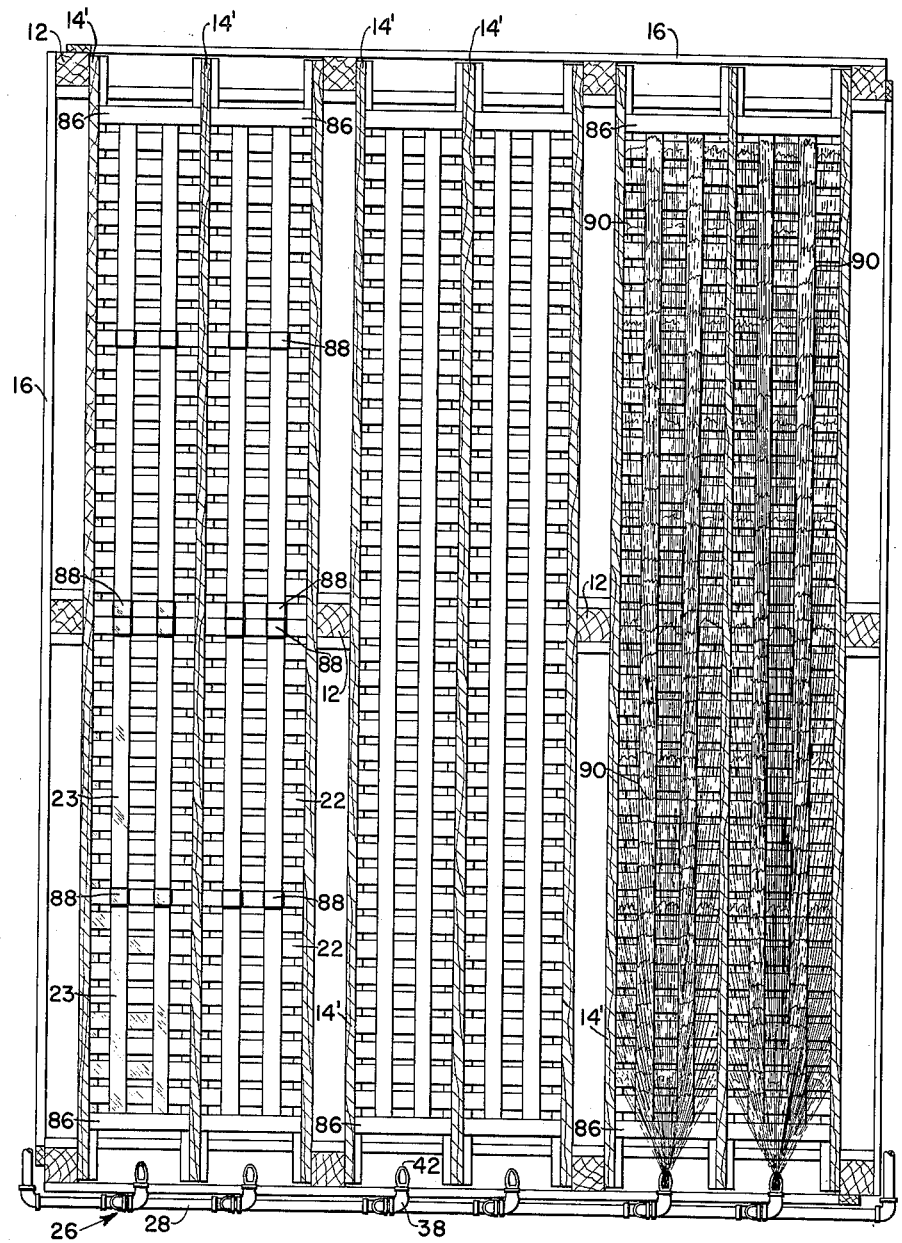
FIG. 4 is a plan view in section taken on the line 4—4 of FIG. 3 illustrating two different modifications of cooling tower structure and also illustrating the general distribution of the water along the distribution deck.
Figure 5:
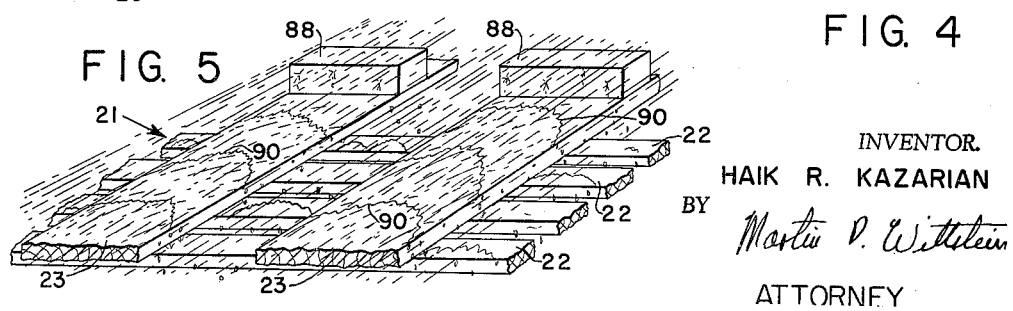
FIG. 5 is a view in perspective of a portion of the distribution deck illustrating in more detail the movement of water along the runners and slats of the distribution deck.

Referring now to FIGS. 4 and 5, the cooperation between the sprinkler system and the distribution deck construction is clearly shown in these two views. In addition to the slats 22 and the runners 23 of the distribution deck, there are a plurality of cross-members 86 which overlie the runners 23. These cross-members assist in preventing water from running off the ends of the runners when the cooling tower is in operation and also assist in the stacking of distribution deck sections when not in use. Under normal distribution deck construction, these cross-members occur every four feet; also, the distribution deck is normally fabricated in eight foot sections, resulting in a cross-member 86 at each end and in the middle of each section. Obviously these cross-members would interfere with the efficient distribution of fire protection water by acting as a dam at spaced intervals along the protected area.

Consequently, these cross-members have been removed intermediate the extreme ends of the distribution deck within the frame unit 10, and, in one embodiment illustrated in the left hand bay of FIG. 4, have been replaced with blocks 88 disposed on the runners 23, leaving a space between the blocks through which the fire protection water can pass. It has been found that enough water passes over the blocks 88, as shown in FIG. 5, and through the spaces between the blocks 88 that they do not constitute a serious impediment to an effective distribution of water. The reason for the retention of these blocks lies in the aforementioned aid they render in stacking sections of distribution deck when not in use.

If the feature of stacking is not considered to be of any great importance then the blocks may be dispensed with entirely, as indicated in the middle bay of FIG. 4, and the runners left completely unobstructed from one end cross member 86 to the other.

The right hand bay in FIG. 4 illustrates the horizontal pattern of the fire protection water as it issues from the nozzle 42, widens out laterally and is directed along the distribution deck 21 by the joists 14' and covers substantially the entire area of the distribution deck. Particular notice is directed to the lines 90 of FIG. 5 which indicate how the runners 23 assist in moving the water further along the distribution deck. This cooperation would not exist if the water were not initially directed into the space between the distribution basin and distribution deck in a substantially solid horizontally directed stream.

It will be apparent from the foregoing description that there has been provided a fire protection system and sprinkler nozzle for use therewith which is believed to provide a solution to the problems, and to fulfill the objectives, hereinbefore set forth. It is to be understood, however, that the above description and accompanying drawings are to be deemed primarily as illustrative of the best mode presently contemplated of carrying out the principles of the invention, and that the device described and illustrated may be modified or altered in its form, proportions, detail of construction and arrangement of parts without departing from the spirit and scope of the invention as defined in the appended claims.

What I claim and desire to secure by Letters Patent is:

1. A sprinkler nozzle comprising an elongate body having a bore of circular cross-section therethrough which terminates at the ends thereof, a bushing of circular cross-section disposed in said bore in fluid tight relationship therewith, said bushing having a flow passageway of circular cross-section therethrough, said flow passageway having an outlet end terminating in an outlet orifice adjacent one end of said body and being disposed in said bushing with its longitudinal axis at an angle to said longitudinal axis of said body whereby a substantially solid stream of liquid issuing from said outlet orifice will be at least initially directed along the longitudinal axis of said flow passageway, and a pair of yoke arms attached to opposite sides of said body adjacent said one end of said body, said yoke arms lying in a plane which is parallel to and coincident with said longitudinal axis of said body, said yoke arms curving inwardly toward each other and intersecting at an apex, said yoke arms forming a splitter element at said apex for splitting said solid stream of liquid into two smaller streams of unequal size, said splitter element having two oppositely facing divergent surfaces forming a substantially wedge-shaped member, the angle between said longitudinal axes being such that the narrower end of said splitter element is disposed adjacent the periphery of said solid stream, the surface of said splitter element facing said longitudinal axis of said flow passageway being substantially flat and substantially parallel to said longitudinal axis of said body thereby permitting a major portion of said solid stream to pass said splitter element substantially unobstructed, the surface remote from said longitudinal axis of said flow passageway being rounded from a position substantially normal to said longitudinal axis of said body at said narrower end to a position substantially parallel to said longitudinal axis of said body at said wider end thereby deflecting a minor portion of said solid stream away from said solid stream in a wide spray pattern.

2. A sprinkler nozzle comprising an elongate body having a longitudinal bore therethrough, a removable bushing disposed in said bore, said bushing having a flow passageway therethrough, said flow passageway having an axis which is disposed at a relatively small angle to the longitudinal axis of said bore, and a pair of yoke arms attached to said body, said yoke arms curving inwardly toward each other and intersecting at an apex, said yoke arms forming a splitter element at said apex having an edge facing said passageway and being smaller in width than said bushing, said yoke arms lying in a plane which is coincident with the longitudinal axis of said bore and normal to the plane formed by the longitudinal axis of said bore and the longitudinal axis of said flow passageway, said splitter element being thereby disposed adjacent the periphery of a stream of water issuing from said flow passageway whereby said stream of water is divided by said splitter element into two smaller streams of unequal size.

3. The sprinkler nozzle of claim 2 wherein said longitudinal bore is defined by an internal surface of circular cross-section which tapers slightly inwardly from the inlet end thereof to adjacent the outlet end thereof, and said bushing has an external surface which conforms to said internal surface of said bore and is engaged in fluid-tight relationship therewith, said flow passageway being defined by an internal surface which is circular in cross-section and which tapers slightly inwardly from the inlet end thereof to adjacent the outlet end thereof.

4. The sprinkler nozzle of claim 3 wherein said angle between said longitudinal axes is approximately 6½°.

5. In combination with a water cooling tower having a frame, a distribution basin mounted on top of said frame, a distribution deck supported by said frame beneath said distribution basin, said distribution deck comprising a plurality of relatively long narrow strips spaced apart from each other a short distance to permit water to drip therebetween, and a pair of relatively long narrow runners disposed on said strips with their longitudinal axes perpendicular to the longitudinal axes of said strips, the upper surface of said strips and said runners being unobstructed over a major portion of the length of said runners, and side members defining, with the lower surface of said distribution basin and the upper surface of said distribution deck, a long narrow and confined space between said distribution basin lower surface and said distribution deck upper surface, said space having a first longitudinal axis along its major dimension, a fire protection sprinkler system for said cooling tower comprising a source of water under pressure, conduit means for said water extending along at least one end of said tower adjacent the top thereof, an elongated nozzle connected to said conduit means and disposed adjacent one end of said space for discharging a substantially solid stream of water under pressure into said space, said nozzle having a substantially straight flow passageway therethrough disposed with its longitudinal axis substantially parallel to said first mentioned axis, said flow passageway having a circular cross-sectional configuration at its outlet end, means spaced from said outlet end joined to said nozzle for splitting a stream of liquid issuing from said flow passageway into a large main stream and a small secondary stream which combine to distribute said water substantially evenly over substantially all of the surface area of said distribution deck, said means being a substantially wedge-shaped member, when viewed in vertical plane, with the edge of the wedge toward the flow passageway, said member having a substantially flat upper face and being disposed with the said edge substantially tangent to a cylindrical extension of the circular outlet configuration of said flow passageway along its axis.

6. In combination with a water cooling tower having a frame, a distribution basin mounted on top of said frame, a distribution deck supported by said frame beneath said distribution basin, said distribution deck comprising a plurality of relatively long narrow strips spaced apart from each other a short distance to permit water to drip therebetween, and at least one pair of relatively long narrow runners disposed on said strips with their longitudinal axes perpendicular to the longitudinal axes of said strips, the upper surface of said strips and said runners being unobstructed over a major portion of the length of said runners, and at least one pair of joists supporting said distribution basin on said frame, said joists constituting side members which, with the lower surface of said distribution basin and the upper surface of said distribution deck, define at least one long narrow and confined joist channel between said distribution basin lower surface and said distribution deck upper surface, said joint channel being open at at least one end thereof and having a longitudinal axis along its major dimension, a fire protection sprinkler system for said cooling tower comprising a source of water under pressure, conduit means for said water extending along at least one elongated nozzle connected to said conduit means and disposed adjacent said open end of said joist channel for discharging a substantially solid stream of water under pressure into said joist channel, said nozzle having a substantially straight flow passageway therethrough disposed centrally of said runners with its longitudinal axis substantially parallel to said first mentioned axis, said flow passageway having a circular cross-sectional configuration at its outlet end, means spaced from said outlet end joined to said nozzle for splitting a stream of liquid issuing from said flow passageway into a large main stream flowing unimpeded along the upper surface of said strips and said runners and thereby being substantially evenly distributed over the width of said joist channel remote from said nozzle, and a small secondary stream deflected to distribute said water substantially evenly over substantially all of the surface area of said joist channel close to said nozzle, said means being a substantially wedge-shaped member, when viewed in vertical plane, with the edge of the wedge toward the flow passageway, said member having a substantially flat upper face and being disposed with the said edge substantially tangent to a cylindrical extension of the circular outlet configuration of said flow passageway along its axis.

7. A sprinkler nozzle comprising an elongate body having a longitudinal axis and having a flow passageway therethrough, said flow passageway having a longitudinal axis and a circular cross-sectional configuration at its outlet end and terminating in a substantially cylindrical outlet orifice adjacent said outlet end, means spaced from said orifice and joined to said body for splitting a stream of liquid issuing from said flow passageway into two smaller streams, a large main stream and a small secondary stream, said means having a cross-sectional width and area at any point taken perpendicular to the axis of said body which is smaller than the width and cross-sectional area of said outlet orifice, said means being a substantially wedge-shaped member viewed in a plane containing the longitudinal axes of said body and said flow passageway, said member having a substantially flat face substantially parallel to the longitudinal axis of said body and an outwardly divergent rounded surface, said member being disposed substantially tangent to a cylindrical extension of the circular outlet configuration of said flow passageway along the longitudinal axis of said flow passageway with the edge of the wedge toward the outlet orifice.

References Cited by the Examiner
UNITED STATES PATENTS

| 2,812,980 | 11/57 | Kadosch et al. | 239—502 |
| 2,046,169 | 6/36 | Knight | 169—37 X |
| 2,378,273 | 6/45 | Wilhelm | 169—38 |
| 2,778,865 | 1/57 | Umbricht | 239—518 |
| 2,812,980 | 11/57 | Kadosch et al. | 239—502 |

EVERETT W. KIRBY, *Primary Examiner.*

EUGENE F. BLANCHARD, *Examiner.*